United States Patent [19]

Mettes et al.

[11] 4,396,658

[45] Aug. 2, 1983

[54] POLYMER ALLOY COATING FOR METAL SUBSTRATE

[75] Inventors: Hal J. Mettes, Manvel; Barnard P. E. Goodman, Pearland, both of Tex.

[73] Assignee: AMF Incorporated, White Plains, N.Y.

[21] Appl. No.: 355,060

[22] Filed: Mar. 5, 1982

[51] Int. Cl.$^3$ .................... B32B 1/08; B05D 1/36; C08L 77/00

[52] U.S. Cl. .................... 428/36; 427/239; 427/318; 427/388.1; 427/409; 428/458; 525/436; 525/537

[58] Field of Search ............ 427/239, 318, 388.1, 427/409; 428/36, 458; 525/436, 537

[56] References Cited

U.S. PATENT DOCUMENTS

| | | | |
|---|---|---|---|
| 3,179,633 | 4/1965 | Endrey | 428/458 X |
| 3,179,634 | 4/1965 | Edwards | 428/458 X |
| 3,354,129 | 11/1967 | Edmunds et al. | |
| 3,454,445 | 7/1969 | Durst et al. | 428/458 X |
| 3,505,277 | 4/1970 | Soehngen | |
| 3,562,223 | 2/1971 | Bargain et al. | |
| 3,582,458 | 6/1971 | Haller | 428/458 X |
| 3,658,938 | 4/1972 | Kwiatkowski et al. | |
| 3,708,458 | 1/1973 | Alberino et al. | |
| 3,712,932 | 1/1973 | Balme et al. | |
| 3,744,530 | 7/1973 | Perry | |
| 3,801,379 | 4/1974 | Blackwell | |
| 3,819,407 | 6/1974 | Oates et al. | |
| 3,845,018 | 10/1974 | Bilow et al. | |
| 3,864,309 | 2/1975 | Bilow et al. | |
| 3,879,349 | 4/1975 | Bilow et al. | |
| 4,017,555 | 4/1977 | Alvarez | |
| 4,054,704 | 10/1977 | Vassiliou | 428/458 X |
| 4,054,705 | 10/1977 | Vassiliou | 428/458 X |
| 4,064,303 | 12/1977 | Vassiliou | 428/458 X |
| 4,139,576 | 2/1979 | Toshimura et al. | |
| 4,156,049 | 5/1979 | Hodes et al. | 428/458 X |
| 4,307,220 | 12/1981 | Lucarelli et al. | |

OTHER PUBLICATIONS

"High Temperature and Corrosion Resistant Coatings of Polyphenylene Sulfide", Phillips Chemical Co. Tech. Serv. Memorandum TSM-275, Jul. 1976.
Arkles et al., "Wear Behavior of Thermoplastic Polymer-Filled PTFE Composites", Journal of the Amer. Soc. of Lubrication Engineers, vol. 33, #1, pp. 33-38, Jan. 1977.
Alvarez et al., "High Temperature Performance Polymeric Alloys", Society of Plastics Engineers, Technical Paper 35-308, 1977.
"Elastomer-Toughened Polyimide Adhesives", Nasa Tech. Briefs, Spring 1981, pp. 38-39.
Landis et al., "Homopolymerizable Acetylene-Terminated Polyimides", Polym. Prepr., Am. Chem. Soc. Div. Polym. Chem., vol. 15, No. 2, Jan. 9, 1974, pp. 537-541.
"Formulating Adhesives With Thermid 600", Gulf Advanced Materials.
Hill et al., "Ryton Polyphenylene Sulfide: Caring Technology", Phillips Petroleum Co., Res. & Dev. Report 5701-70, Jul. 1, 1970.
Blackwell, "Ryton Polyphenylene Sulfide Coatings by Dry Powder Spraying", Phillips Petroleum Co., Res. & Dev. Report, 5832-70, Jan. 21, 1971.

*Primary Examiner*—James R. Hoffman
*Attorney, Agent, or Firm*—David E. Dougherty; Michael E. Zall

[57] ABSTRACT

A novel polymer alloy coating is provided consisting essentially of polyphenylene sulfide and an amount of polyimide. The polyimide is produced by the crosslinking and curing of an acetylene terminated aromatic polyimide oligomer resin. The amount of polyimide utilized is sufficient to enhance the adhesiveness of the polyphenylene sulfide to a metal substrate without substantially changing the melt flow properties, chemical resistance and thermal stability of the polyphenylene sulfide. A polymer alloy resin composition is also provided for application to the metal substrate to produce the polymer alloy coating. The novel polymer alloy coating is particularly suitable for coating pipes, particularly pipe couplings for oil and gas well production pipes which are exposed to extreme temperatures, pressures and corrosive environments.

28 Claims, No Drawings

POLYMER ALLOY COATING FOR METAL SUBSTRATE

BACKGROUND OF THE INVENTION

1. Field of the Invention

This invention relates to a novel polymer alloy coating, in particular a polymer alloy coating having enhanced adhesiveness to metal substrates which are exposed to extreme temperatures, pressures and corrosive environments encountered, for example, in oil and gas well tubulars, particularly in the pipe couplings.

2. Prior Art

In the producing of oil and gas wells it is necessary to use a large number of pipe or tubular sections connected by couplings, which are screwed to the pipe. The interior of these pipes, as well as the couplings, are often subjected to continuously high temperatures, e.g. up to about 210° C., high pressures, e.g. up to about 20,000 psi, and an extremely corrosive environment produced by chemicals such as hydrocarbons, carbon dioxide and hydrogen sulfide in the presence of water. In order for a coating used on such pipes and couplings to protect the metal substrate from corrosion, the coating must be resistant to attack and maintain its adherance to the metal substrate under such conditions.

Arylene sulfide polymers are well known in the art, see U.S. Pat. No. 3,354,129 to Edmonds, Jr. et al (Phillips Petroleum Co., 1967). Generally, these polymers consist of a recurring aromatic structure coupled in repeating units through a sulphur atom. Commercially available arylene sulfide polymers which have been used for coating oil and gas well pipe couplings are polyphenylene sulfides. Polyphenylene sulfides have the general formula:

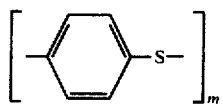

The polyphenylene sulfides found useful for such coatings have high melting points, outstanding chemical resistance, thermal stability and are non-flammable. These polymers are characterized by stiffness and good retention of mechanical properties at elevated temperatures as well as the ability to flow and deform smoothly, thereby prevent the galling of threads even at high thicknesses, i.e. greater than 10 mils. A highly preferred polyphenylene sulfide for such use is sold by Phillips Petroleum Company under the trademark RYTON.

The polyphenylene sulfide coatings have been found to have excellent stability under the adverse conditions found in oil and gas well production pipe. However, with the advent of fuel shortages and higher fuel prices it has become economically feasible to drill deeper wells. Along with such increased depths have come higher pressures, temperatures and corrosive environments and new type production pipe and couplings, making the known polyphenylene sulfide coatings more susceptible to permeation by water, carbonic acid, hydrogen sulfide, etc. resulting in poor adhesion, i.e., disbonding and blistering, of the coating to the metal substrate.

The Assignee in prior filed U.S. application Ser. No. 68,571 filed on Aug. 31, 1970, by Goodman (now abandoned) realized that the adhesion of polyphenylene sulfide to a metal substrate was not satisfactory under severe environmental conditions. Several theories were put forth in Goodman, i.e., lack of adequate wetting of the steel substrate by the polyphenylene sulfide, lack of polar chemical groups to contribute to the adhesion of the polyphenylene sulfide to the steel substrate, oxidation of the steel substrate to form a poor bonding surface for the polyphenylene sulfide when heated to such high temperatures of application, etc. Goodman attempted to solve this problem of poor bonding and adhesion of the polyphenylene sulfide to the metal substrate by mixing with the resin powder a small quantity of powdered tin. The powdered tin was mixed with a fluxing agent for the tin, suitable liquid carrier and a binder and then applied to a clean metal substrate. The mixture was then heated to a temperature in excess of 650° F. (343° C.) to melt the tin and polyphenylene sulfide resin and to drive off the liquid carrier. This type coating was found not to be as satisfactory as initially thought and the Goodman application was abandoned. This problem has remained unsolved until this invention.

There are a myriad of polyimide type resins whose properties are generally well known in the art. Exemplary U.S. Pat. Nos. describing such polyimides and their uses are: 3,179,630 to Scroog et al (1965); 3,179,631 to Scroog et al (1965); 3,179,632 to Hendrix (1965); 3,179,633 to Endrey (1965); 3,179,634 to Edwards (1965); 3,454,445 to Durst et al (1969); 3,505,277 to Soehngen (1970); 3,562,223 to Bargain (1971); 3,582,458 to Haller (1972); 3,708,458 to Alberino et al (1973); 4,054,704 to Vassiliou (1977); 4,054,705 to Vassiliou (1977); and 4,064,303 to Vassiliou (1977);

These polyimide resins are known to be useful as shaped structures, self-supporting films, fibers, filaments and coatings. They, generally, have high tensile strength, are infusible, insoluble, stable to heat, water and to corrosive environments. The films may be used in corrosion resistant pipe, pipe-lagging and duct work, for containers and container linings and in laminating structures where the films are bonded to the sheet metal or foils, oven interiors, and electrical insulation.

Particularly unique polyimides are derived from the homopolymerization or polymerization of acetylene terminated aromatic polyimide oligomers. These polyimides and their preparation are described in Landis et al, Polym. Prepr., Am. Chem. Soc., Div. Polym. Chem., Vol. 15, No. 2, Jan. 9, 1974, pp 537–41; U.S. Pat. Nos. 3,845,018 (1974), 3,864,309 (1975) and 3,879,349 (1975) all to Bilow et al; and U.S. Pat. No. 4,307,220 to Lucarelli et al (1981). These addition curable polyimide oligomers crosslink and cure without offgassing to produce low void moldings and structural composites of high strength which are stable up to 370° C. Some of these polyimide oligomers are sold by Gulf under the trademark THERMID. The properties of some of these polyimides are described in Gulf Advanced Materials, "Formulating Adhesives with THERMID 600" (undated) and various technical bulletins from Gulf which are incorporated herein by reference and made a part of this file (28 pages).

There are numerous references which describe blends or laminates of polyphenylene sulfide or polyimides. The aforementioned Edmonds, Jr. et al indicates that polyphenylene sulfide may be blended with fillers, pigments, stabilizers, softeners, extenders and other polymers. No specific examples are given of such polymer blends. The coating of pipes to prevent corrosion resistance is also described.

Phillips Petroleum company, *Research and Development Report* 5701-70 Rev., Unit No. 798, Feature No. 7101, July 1, 1970 states that polyphenylene sulfide has a strong affinity for a variety of fillers and that thermally stable materials have been used to modify color, gloss, coefficient of friction and flexibility, making polyphenylene sulfide useful for both protective coatings and non-stick coatings.

Phillips Petroleum Company, *Research and Development Report* 5832-70 Rev., Unit No. 798 Feature No. 7101, Jan. 6, 1971, describes polyphenylene sulfide coatings applied to steel and aluminum substrates by dry powder spraying. The report states that "... addition of fillers was found to be desirable to improve adhesion, appearance, and color, and addition of PTFE (polytetrafluorethylene) produced 'non-stick' coatings". The only other fillers described are $TiO_2$ and $Fe_2O_3$.

Phillips' *Technical Service Memorandum*-275, July, 1976 describes using polyphenylene in high temperature and corrosive environments, such as pipe couplings, pumps, valves, tanks, reactors, sucker rods, oil well tubing and fan drive discs. The memorandum further states that polyphenylene sulfide has an excellent affinity for a variety of fillers which can withstand the 700° F. (371° C.) curing temperatures. The only blend suggested in the memorandum is polyphenylene sulfide with PTFE. PTFE composities with polyphenylene sulfide are also described in Arkles et al "Wear Behaviour of Thermoplastic Polymer-Filled PTFE Composites" Journal of the American Society of Lubrication Engineers, Vol. 33, 1, 33-38, January, 1977.

U.S. Pat. No. 3,744,530 to Perry (Phillips Petroleum Co., 1973) describes polyphenylene sulfide coated pipes and methods of coating such pipes. The polyphenylene sulfide coating used contains a filler, such as iron oxide, in an amount of between about 5% to about 30% by weight.

U.S. Pat. No. 3,801,379 to Blackwell (Phillips Petroleum Co., 1974) describes treating an aluminum surface with water at a temperature of at least 70° C. to enhance the adherance of arylene sulfide polymer thereto. This is said to be an improvement over primers for the substrate or incorporating additives into the polymer to improve adhesion.

U.S. Pat. No. 3,819,407 to Oates et al (1974) describes a high temperature and erosion resistant laminate comprising a polyimide layer coated with a poly(arylene sulfide) resin.

U.S. Pat. No. 4,017,555 to Alvarez (1977) is directed to polymeric alloys of polyphenylene sulfide and polyimides used for molding structures. The polyimides used in Alvarez do not melt and must be fabricated by machining, punching or by direct forming techniques. The preferred polyimide resin molding powder is a completely imidized, fully reacted aromatic polyimide resin of the type described in the aforementioned U.S. Pat. No. 3,708,458 to Alberino et al (1973) and sold under the trademark POLYIMIDE 2080 by the Upjohn Company. Alvarez (and also Alvarez et al, "High Temperature Performance Polymeric Alloys", Society of Plastics Engineers, Tech. Paper 35-308, 1977), indicates that the optimum ratio of polyphenylene sulfide to polyimide is 50/50 to 80/20, i.e. alloys containing less than 20% polyimide are undesirable.

U.S. Pat. No. 4,156,049 to Hodes et al (1979) describes a laminate for antifriction and slide members. The laminate comprises a metallic substrate strip having bonded to a surface a slide layer of thermosetting polyimide resins, and additives which improve the running properties of a bearing, such as polytetrafluorethylene. The slide layer additionally can contain polyimide resins and other additives, in fine grain or fine powdered form. The fine grain or fine powdered polyimide resin mixture, may be supplemented with a highly heat and abrasion resistant thermoplastic, preferably polyphenylene sulfide.

U.S. Pat. No. 4,139,576 to Yoshimura et al (1979) describes a fluorocarbon polymer coating composition which includes a polyarylene sulfide resin, e.g. polyphenylene sulfide and at least one imido containing resin e.g. polyimide. The fluorocarbon polymer is a necessary element of Yoshimura et al.

Other references of interest are:

*NASA Tech Briefs*, Spring 1981 "Elastomer-Toughened Polyimide Adhesives", describes the use of addition polyimides as high-temperature adhesives for bonding composite materials and such metals as titanium. The incorporation of elastomers, e.g. fluorosilicone rubber, SYLGARD 184 resin from Dow Corning, an aromatic amine-terminated butadiene/acrylonitrile, and an aromatic amine-terminated silicone, into the polyimide matrix was used to modify polymer toughness. All four additives increased the peel strength of the polyimides.

U.S. Pat. No. 3,652,409 to Mack et al (1972), describes a composition containing polytetrafluoroethylene resin and polyimide resin to produce a molded shape having exceptional resistance to frictional wear.

U.S. Pat. No. 3,658,938 to Kwitkowski et al (1972) describes a mechanical blending of polysulfones with certain polyamide/imides where shaped articles and the like are to be fabricated by injection molding techniques.

U.S. Pat. No. 3,712,932 to Balme (1973) describes a film forming heat stable composition comprising a polysulfone and a specific type imide pre-polymer. The compositions are said to be suitable for the preparation of films and fibers and for the preparation of coatings, adhesives and laminated materials.

OBJECTS AND SUMMARY OF INVENTION

It is an object of this invention to provide a polyphenylene sulfide alloy coating having enhanced adhesiveness to a metal substrate.

It is a further object of this invention to provide a polymer alloy resin composition which when applied to a metal substrate forms a polyphenylene alloy coating having enhanced adhesiveness to the metal substrate.

It is still a further object of this invention to provide a polyphenylene polymer alloy coating for oil and gas well production pipe, particularly couplings, having enhanced adhesiveness under the extreme conditions to which such pipe and couplings are subjected.

It is another object of this invention to provide a process for coating a metal substrate with a polyphenylene polymer coating having enhanced adhesiveness to the substrate.

It is still another object of this invention to provide a method of enhancing the adhesiveness of polyphenylene sulfide resin to a metal substrate without substantially changing the melt flow properties, chemical resistance and thermal stability of the polyphenylene sulfide.

The foregoing objects of this invention are achieved by a novel polymer alloy coating consisting essentially of polyphenylene sulfide and an amount of a polyimide sufficient to enhance the adhesiveness of the polyphenylene sulfide to a metal substrate without substantially changing the melt flow properties, chemical resistance and thermal stability of the polyphenylene sulfide. The polyimide is produced by the crosslinking and curing of an acetylene terminated aromatic polyimide oligomer resin.

This invention further provides for a polymer alloy resin composition consisting essentially of polyphenylene sulfide and a sufficient amount of the aforementioned polyimide, resin as well as a process for applying the aforementioned polymer alloy coating to a metal substrate. A method is also provided for enhancing the adhesiveness of polyphenylene sulfide resin to a metal substrate without substantially changing the melt flow properties, chemical resistance and thermal stability of the polyphenylene sulfide, comprising adding to the polyphenylene sulfide resin an effective amount of the aforementioned polyimide resin. The polyimide resin may also be applied to the metal substrate as a prime coat to enhance the adhesiveness of a subsequently applied polyphenylene sulfide coating to the substrate.

DETAILED DESCRIPTION OF THE INVENTION

By the use of the term "polymer alloy" it is meant the physical mixture of structurally different polymers. This may also be termed a polyblend. This is in contrast to copolymers in which the components are linked together by covalent chemical bonds. It is theorized that the components in the polymer alloy coating of this invention, adhere together primarily through van der Waal forces, dipole interactions, and/or hydrogen bonding.

A major portion of the polymer alloy of this invention consists essentially of polyphenylene sulfide. The polyphenylene sulfide resins used in this invention, belong to a class of resins which are polymers having a recurring unit of an aryl group and sulfur or a recurring unit composed of an aryl group and a group containing sulfur and oxygen. All of these resins should be essentially equivalent to each other when used in this invention. These polyarylene resins, including polyphenylene sulfide, are described in detail in U.S. Pat. No. 3,354,129 to Edmonds, Jr. et al., the entire disclosure of which is incorporated herein by reference.

As disclosed in Edmonds, Jr. et al., these polymer resins can be prepared by reacting an aromatic polyhalo-substituted compound and an alkali metal sulfide in a polar organic solvent. The resulting polymer contains the aromatic structure of the polyhalo-substituted compound coupled in repeating units through a sulphur atom. Preferred polymers which are equivalent when used in this invention, are those polymers having the repeating unit $(R-S)_x$ wherein R is phenylene, biphenylene, naphthylene, biphenylene ether or a lower alkyl substituted derivative thereof. By "lower alkyl" is meant alkyl groups having 1 to 6 carbon atoms such as methyl, propyl, isobutyl, n-hexyl and the like. Such polymers are desirable because of their high thermal stability and potential availability.

The preferred polyphenylene sulfide is a crystalline aromatic polymer, which has a symmetrical, rigid backbone chain consisting of recurring para-substituted benzene rings and sulphur atoms, and has the general structure:

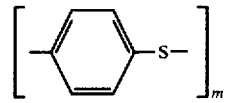

The polyphenylene sulfides preferred for use in this invention have high melting points, outstanding chemical resistance, thermal stability and are non-flammable. The polymers which are particularly preferred are those which are thermally stable and melt of temperatures above about 200° C., i.e., m in the foregoing formula is a positive integer selected to result in a polyphenylene sulfide polymer having such properties. These polyphenylene sulfide polymers may have melting temperatures up to about 500° C. These polyphenylene sulfides produce a polymer alloy coating which can withstand the extreme conditions in oil and gas well production pipe, particularly at the couplings.

The highly preferred polyphenylene sulfide used in this invention is commercially available from Phillips Petroleum Company under the trademark RYTON. This product is sold as a finely divided powder having a low molecular weight and a high melt flow temperature. This product can be fused and cured at temperatures of about 370° C., well above the melting point of 288° C. of the polymer. Parts molded from or coated with this preferred polyphenylene sulfide can be used at temperatures up to about 260° C.

The acetylene terminated aromatic polyimide oligomers used in this invention and their production and purification are described in the aforementioned Landis et al reference and the Bilow et al and Lucarelli et al patents. The entire disclosures of all of these references are incorporated herein by reference.

The preferred polyimide used in this invention is produced by crosslinking and curing a polyimide oligomer resin of the formula:

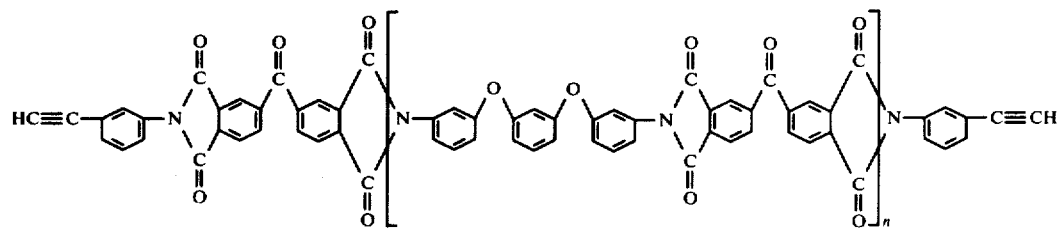

wherein n is from about 1 to about 2. This polyimide is commercially available from Gulf under the trademark THERMID MC-600. THERMID MC-600 is a tan powder, has a molecular weight of approximately 1099, a specific gravity of 1.36 and a melting range of 190° C. to 210° C. and glass transition temperature of 330° C.

Other type acetylene terminated aromatic polyimide oligomer resins are the amic acid and amic ester forms of the above oligomer, for example:

above the melt flow temperature, i.e. melting or softening point, of the polymer alloy resin composition, but below the decomposition point. Preferably these tem-

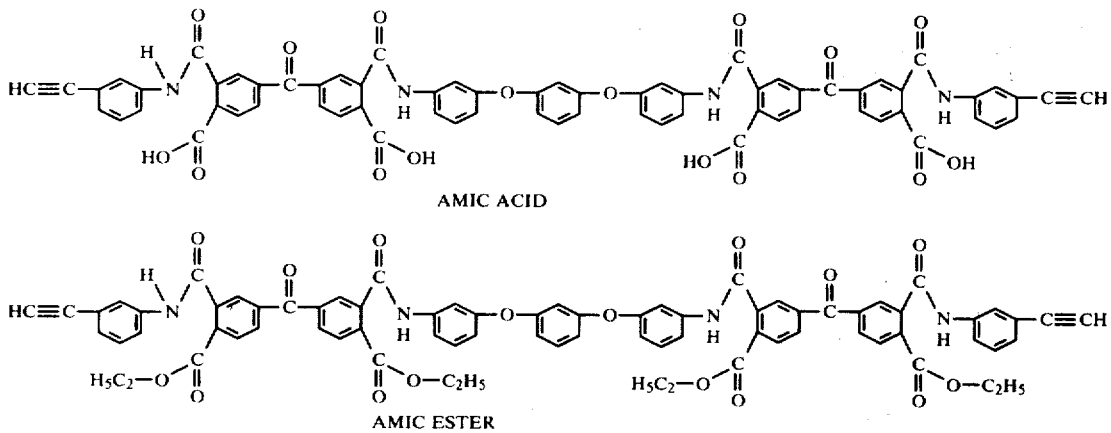

AMIC ACID

AMIC ESTER

These oligomers are also commercially available from Gulf under the trademarks THERMID LR-600 and THERMID AL-600, respectively. These specific oligomer forms of THERMID MC-600 are less preferred than THERMID MC-600 for they are in liquid form and not amenable to the preferred method of application which includes contacting the metal substrate with a powdered alloy resin mixture of the polyphenylene sulfide and polyimide oligomer. However, they may be used as prime coats for a subsequently applied polyphenylene sulfide polymer coating.

The amount of polyimide used in the polymer alloy coating of this invention is an amount which is sufficient to enhance the adhesiveness of the polyphenylene sulfide to the metal substrate without substantially changing the desirable melt flow properties, chemical resistance and thermal stability of the polyphenylene sulfide. Generally, this means an amount of polyimide of less than about 15% by weight of the alloy coating, preferably less than about 10% by weight, and most preferably from about 2.5% to about 7.5% by weight.

The polymer alloy coating is preferably produced from a polymer alloy resin composition which consists essentially of a mixture of the polyphenylene sulfide resin and polyimide oligomer resin. The amount of polyimide resin in the mixture, when crosslinked and cured, is an amount sufficient to enhance the adhesiveness of the polyphenylene sulfide to the metal substrate without substantially changing the melt flow properties, chemical resistance and thermal stability of the polyphenylene sulfide. This polymer alloy resin composition is preferably in powdered form of a size which passes a 60 mesh screen, i.e. −60 mesh. The coarser the powder the rougher the appearance of the polymer alloy coating on the substrate.

The polymer alloy coating composition of this invention may be applied to the metal substrate by suitable methods well known in the art, preferably those methods which are used for applying polyphenylene sulfide. These methods are well documented in many of the aforementioned references, particularly the Technical Service Memorandums of Phillips Petroleum Company, the entire disclosures of which are incorporated herein by reference.

A preferred process for coating the metal substrate comprises heating the metal substrate to a predetermined temperature. This predetermined temperature is peratures range from about 270° C. to about 420° C., and most preferably about 280° C. to about 345° C. The polymer alloy resin composition is then contacted with the substrate and the substrate is cured for the required amount of time. Multiple coatings may be applied by repeating these steps, i.e. heating, contacting and curing.

Polymer alloy coating thicknesses can vary widely, but generally will be in the range of 0.5–50 mils (12.5 to 1250 microns). Coatings have thickness of 1 to 30 mils (25 to 750 microns) are satisfactory for most uses, and those in the range of 2 to 5 mils (50 to 100 microns) are most preferred for use on oil and gas well production pipe and couplings.

The metal substrate to which the polymer alloy coating is applied may be those which are typically coated with polyphenylene sulfide, i.e. aluminum, steel (e.g. stainless, carbon), cast iron, titanium, brass, bronze, copper, zinc alloys, galvanized metal.

The polymer alloy coating may be applied to the metal substrate by such methods as slurry coating, electrostatic coating, e.g. cold and hot electrostatic spraying, fluidized bed coating and powder spraying, i.e. flocking. These methods are well known in the art. The particular metal substrate, as well as other parameters will determine the method of application.

Powder spraying or flocking is the preferred method of application used in this invention, particularly with oil and gas well production pipes and couplings. After proper surface preparation, e.g sand blasting degreasing, priming, the part should be preheated to 270° C. to 400° C. The polymer alloy resin composition, which is preferably a powder which passes through a 60 Tyler Mesh, is sprayed with a flocking gun onto the part to a thickness of 5 to 10 mils (125 to 250 microns). If a thicker coating is desired, it is prefered to apply multiple coats with a 30 to 45 minute cure between applications. Applying a coating which is too thick in one pass can produce blistering of the coating. To produce a smooth, glossy polymer alloy coating, the powder should be sprayed on the part only as long as it readily melts. The addition of powder that does not melt will result in rough gritty coating.

The powder coated parts should then be returned to the oven for curing as soon as possible, at least prior to the part cooling to below the melt point of the polymer alloy resin composition. The curing time is highly dependant on the coating thickness and curing temperature selected, as well as other factors. The curing schedule is generally from about 270° C. to about 420° C. and for times ranging from about 3 minutes through 72 hours. Obviously, the higher the temperature the shorter the curing time.

A typical curing schedule for the polymer resin alloy of this invention, at 370° C. is as follows:

| Polymer Alloy Coating Thickness (mils) | Time (min) |
| --- | --- |
| 1 to 3 | 45 |
| 5 | 60 |
| 10 | 90 |
| 20 | 120 |
| 40 | 180 |

It has been found, however, that at a curing temperature of about 370° C. less time may be sufficient, e.g. for a 5 to 10 mil coating, 35 minutes has been found to be sufficient.

The polymer alloy compositions of this invention may contain a variety of fillers, typically those which are normally used with polyphenylene sulfide. The filler, however, must withstand at least 280° C. curing temperatures and not be detrimental to the adhesion of the coating to the metal substrate. Typical fillers are titanium dioxide, coloring pigments, chromium oxide ($CrO_2$), and antiflow agents, e.g. Aerosil 972 (silane treated fumed silica, Degussa Corp.).

Preferably, the polymer alloys of this invention are applied to steel oil and gas well production pipe, particularly at the pipe couplings where due to the configuration of the couplings it may be difficult to obtain coatings which will adhere to the substrate. This problem has been found to exist particularly in VAM type couplings from Otis Engineering and Vallourec (described in U.S. Pat. Nos. 3,467,413, 3,468,563, 3,49,437, 3,508,771, 3,574,373 and 3,854,760, all assigned to Vallourec) and similar type couplings from Armco (NU-LOCK, SEAL-LOCK), Mannesmann (TDS) and NL Atlas Bradford (TC-45). In these type couplings the inside threadless surface of the coupling makes it difficult to obtain an adherant coating. The polymer alloy of this invention and the methods of coating described and claimed hereon overcome this problem.

Having now generally described this invention it will become better understood by reference to specific examples. These examples are included herein for the purpose of illustration only and are not intended to be limiting, unless so specified.

EXAMPLE I

A polymer using an acetylene terminated aromatic polyimide oligomer and polyphenylene sulfide was tested. The polyimide oligomer is commercially produced by the Gulf Oil Chemical Company and sold under the trademark THERMID MC-600; (Abstract Designation: 1,3 Isobenzofurandione, 5,5'-carbonyl bis-, polymer with 3-ethynylbezenamine and 3,3'-(1,3-phenylenebis(oxy))bis benzenamine.; CAS Registry No.: 55157-26-1). The polyphenylene sulfide was commercially produced by Phillips Petroleum under the trademark RYTON. The V-1 grade was used.

In a twin blade water jacketed Henschel mixer, 81 parts RYTON V-1 powder, 18.6 parts iron oxide or chrome oxide powder, and 0.4 parts Aerosil 972 powder were mixed for 10 minutes. Ninety-four parts of this mixture and 6 parts of THERMID MC-600 were added and ball milled for about 45 minutes.

The resulting mixture was sprayed with a flocking gun onto a metal substrate "white metal" sandblasted preheated to 700° F. (371° C.), until a thickness of between 125 and 250 microns (5 mils and 10 mils) was achieved. The coating was then baked at 700° F. (371° C.) for 35 minutes and subsequently water quenched. The resulting coating exhibited a gloss only slightly less than the RYTON composition without the polyimide.

To test the melt-flow characteristics of the alloy, a 2000 volt hot spark Holiday (Void) Test was performed on the coated metal as follows. A UVRAL Type PHD15 was used with the output set at 2000 volts and the sensitivity set at maximum. When the metal substrate is grounded and the contact lead moved over the cured coating, any voids (Holidays) in the coating will be detected as a hot spark passes from the contact lead through the void in the coating to the grounded metal substrate.

RYTON coatings in the 5 to 10 mil range can be prepared which are glossy and Holiday-free. Holiday-free coatings of the polymer alloy were obtained only when the percentage of polyimide to RYTON was 10% or less, although it is believed that such coatings can be obtained with up to about 15% polyimide. It was also noted that the physical mixing of the powders prior to the melt processing effects how smooth and void free the coating will be. Extremely rough coatings with many Holidays result when high shear forces are used to mix the polyimide with the polyphenylene sulfide.

EXAMPLE II

An experiment was conducted to determine the chemical adhesion properties of the polymer alloy of polyphenylene sulfide and polyimide. The mixture of polymers described in EXAMPLE I was flocked onto steel metal bars which had been sandblasted to "white metal" with #16 garnet abrasive, as defined by N.A.C.E. (National Association of Corrosion Engineers). The metal bars were preheated to 700° F. (371° C.) and the powder was flocked onto the metal using powder spray equipment known in the art, to a thickness of 125 to 250 microns (5 mils to 10 mils). The bars were then cured at 700° F. (371° C.) for 35 minutes and water quenched. These coated bars were then put through an autoclave test used throughout the oilfield industry to test coatings for immersion service. The coated bars were placed in a glass beaker in a stainless steel high pressure autoclave. The beaker was half filled with one part tap water and one part toluene or kerosene. The temperature and pressure were then increased up to 300° F. (149° C.) and 8 to 10 thousand psig of $CO_2$ gas, which also produced a saturated $CO_2$ liquid phase. This temperature and pressure were maintained for 12 to 15 hours. The temperature was then allowed to drop to about 200° F. (93° C.) at which time the pressure was instantaneously released.

At the high temperature and pressure, all coatings were permeated by water, $CO_2$ gas, and hydrocarbons to some degree. Any coatings which would resist attack by the water, gas and hydrocarbons must also maintain excellent chemical adhesion to the metal substrate and cohesion within itself (chemical resistance and integrity). Polyphenylene sulfide, e.g. RYTON, coatings maintain good cohesion under these test conditions and resist attack. However, such coatings permit permeation of water and $CO_2$ gas to the substrate and when the pressure is suddenly released, disbond from the metal substrate and crack as the gas and water expand and escape. The polymer alloy coating had excellent adhesion to the metal substrate and maintained a smooth unblemished Holiday-free surface.

EXAMPLE III

This experiment was used to grade the adhesion of the autoclaved coatings. The unalloyed RYTON autoclaved coating graded an "F" in both gas and liquid phases. An "F" grade is defined as coating which disbonds and cracks without the use of a knife.

The autoclaved alloyed polyphenylene sulfide/polyimide coating demonstrated a "C" adhesion with good adhesion throughout gas and liquid phases. A "C" adhesion is defined as a coating which when cut down to metal and pried off of the metal substrate, still leaves 50% or more of the metal surface covered with coating.

EXAMPLE IV

An attempt to duplicate EXAMPLES I, II, AND III was made using three other polyimides, one of which melts (Rhone-Poulenc's KERMID 601) and two of which do not melt (Upjohn's PI 2080 and Ciba Geigy's XU 218), all of which are not acetylene terminated aromatic polyimide oligomers. In both cases a successful void-free (Holiday-free) smooth coating was obtained as described in EXAMPLE I. However, when EXAMPLE II and III tests were performed on these polyalloys in varying proportions of polymers, the resulting coatings were graded as "F's", i.e. no better than the unalloyed polyphenylene sulfide coating.

EXAMPLE V

It is contemplated that a prime coat of the acetylene terminated aromatic polyimide oligomer could also be used to enhance the adhesion characteristics of polyphenylene sulfide coatings. Thus a 25 micron (1 mil) prime coat of the THERMID MC-600 was flocked onto the sandblasted preheated metal and the polyphenylene sulfide coating was immediately flocked on top of this prime coat to a thickness of between 125 and 250 microns (5 and 10 mils). When tested according to EXAMPLES II and III this coating performed better than the polyphenylene coating alone, but not as well as the alloy described in EXAMPLE I.

EXAMPLE VI

EXAMPLE V was repeated with a liquid prime of THERMID MC-600 powder dissolved in NMP (N-methyl pyrrolidone) sprayed onto a cold sandblasted steel metal substrate. The substrate was heated to 700° F. (371° C.) for 15 minutes and polyphenylene sulfide powder flocked into the prime coat. Results were the same as described in EXAMPLE V.

EXAMPLE VII

EXAMPLE VI was repeated using the amic acid form (THERMID LR-600) in NMP. The results were the same as described in EXAMPLE V.

EXAMPLE VIII

EXAMPLE VI was repeated using the alcohol-based amic ester form of (THERMID AL-600) in ethanol. The results were the same as described in EXAMPLE V.

EXAMPLE IX

Another powder type acetylene terminated aromatic polyimide oligomer which is an isomer of THERMID MC-600, i.e. (THERMID IP 605P) was applied as a prime described as in EXAMPLE V. The results were the same as described in EXAMPLE V.

EXAMPLE X

EXAMPLES I, II, AND III were repeated using THERMID IP-605P, with results as described for THERMID MC-600.

A number of hypotheses have been proposed to explain some of the observations from the foregoing tests particularly as to why polyimides other than acetylene terminated aromatic polyimide oligomers do not work.

It is theorized that the extremely reactive acetylene ligands may have a special affinity for the metal substrate. The dense cloud of electrons surrounding the many lateral oxygen atoms may also play a significant part in this affinity for the metal substrate. It is somewhat more difficult to postulate how this affinity for the metal substrate can be passed on when alloying with polyphenylene sulfide (which by itself demonstrates such poor affinity) particularly at such low concentrations, (less than 10%, 6% in a preferred embodiment). One explanation may be that the polyimide opens up the intermolecular spaces in the polyphenylene sulfide cross-linked matrix preventing excessive cross-linking and subsequent shrinking of the coating which result in cracks, i.e. in metallurgical terms, stress relieving the coating. In addition, because the acetylene terminated polyimide oligomers melt at ambient pressures, it is postulated that rapid wetting of the oxidized metal substrate by the polyimide enable hydrogen bonding and other forces to be established between the substrate and coating before the polymer alloy has completely cured.

What is claimed is:

1. A polymer alloy coating consisting essentially of polyphenylene sulfide and an amount of polyimide sufficient to enhance the adhesiveness of the polyphenylene sulfide to a metal substrate without substantially changing the melt flow properties, chemical resistance and thermal stability of the polyphenylene sulfide, wherein the polyimide is produced by the crosslinking and curing of an acetylene terminated aromatic polyimide oligomer resin.

2. A polymer alloy coating consisting essentially of a polyphenylene sulfide and an amount of a polyimide sufficient to enhance the adhesivness of the polyphenylene sulfide to a metal substrate without substantially changing the melt flow properties, chemical resistance and thermal stability of the polyphenylene sulfide, wherein the polyimide is produced by the crosslinking and curing of a polyimide oligomer of the formula:

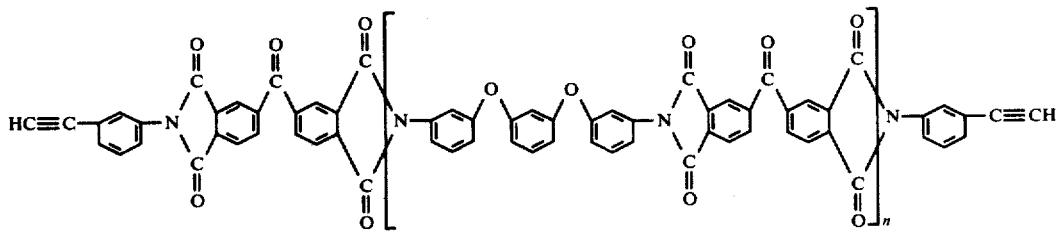

wherein n is from about 1 to about 2.

3. The alloy of claim 1 or 2, wherein the polyphenylene sulfide has the general formula:

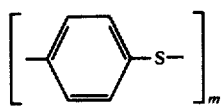

wherein m is a positive integer selected to result in a polyphenylene sulfide polymer which is thermally stable above about 200° C.

4. The alloy coating of claim 3, wherein the amount of polyimide is less than about 15% by weight of the alloy coating.

5. A polymer alloy resin composition consisting essentially of a polyphenylene sulfide resin and an acetylene terminated aromatic polyimide oligomer resin, the amount of polyimide resin, when crosslinked and cured, being sufficient to enhance the adhesiveness of the polyphenylene sulfide to a metal substrate without substantially changing the melt flow properties chemical resistance and thermal stability of the polyphenylene sulfide.

6. A polymer alloy resin composition consisting essentially of a polyphenylene sulfide resin and a polyimide oligomer resin, the amount of polyimide resin, when crosslinked and cured, being sufficient to enhance the adhesivness of the polyphenylene sulfide to a metal substrate without substantially changing the melt flow properties, chemical resistance and thermal stability of the polyphenylene sulfide, wherein the polyimide oligomer resin is of the formula:

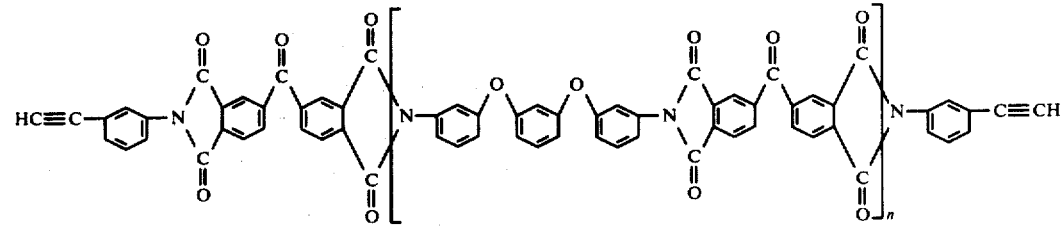

wherein n is from about 1 to about 2.

7. The resin composition of claim 5 or 6, wherein the polyphenylene sulfide has the general formula:

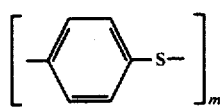

wherein m is a positive integer selected to result in a polyphenylene sulfide polymer which is thermally stable above about 200° C.

8. The resin composition of claim 5 or 6, wherein the amount of polyimide oligomer resin is less than about 15% by weight of the resin composition.

9. The resin composition of claim 5 or 6, wherein the resin composition is a powder which passes through a 60 Tyler mesh.

10. A process for coating a metal substrate comprising applying to the substrate the polymer alloy composition of claim 1.

11. A process for coating a metal substrate comprising:
(a) heating the substrate to a predetermined temperature;
(b) contacting the substrate with a sufficient amount of the polymer alloy resin composition of claim 5 or 6 to coat the substrate; and
(c) curing the coated substrate at a curing temperature for the resin composition,
wherein the predetermined temperature is at least the melt flow temperature of the resin composition.

12. The process of claim 10 or 11, wherein the polyphenylene sulfide has the general formula:

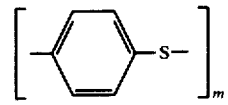

wherein m is a positive integer selected to result in a polyphenylene sulfide polymer which is thermally stable above about 200° C.

13. The process of claim 11, wherein the predetermined temperature and curing temperature are from about 280° C. to about 345° C.

14. The process of claim 11, wherein the amount of polyimide oligomer resin is less than about 15% by weight of the resin composition.

15. The process of claim 10 or 11, wherein the metal substrate is a pipe coupling.

16. The process of claim 10 or 11, wherein the metal substrate is a pipe coupling for oil and gas well production pipe.

17. A metal substrate coated with the polymer alloy coating of claim 1 or 2.

18. A metal pipe coupling coated with the polymer alloy coating of claim 1 or 2.

19. A metal pipe coupling for oil and gas well production pipe coated with the polymer alloy coating of claim 1 or 2.

20. A method of enhancing the adhesiveness of a polyphenylene sulfide resin to a metal substrate without substantially changing the melt flow properties, chemical resistance and thermal stability of the polyphenylene sulfide comprising adding to the resin an effective amount to achieve such enhancement of an acetylene terminated aromatic polyimide oligomer resin.

21. A method of enhancing the adhesiveness of a polyphenylene sulfide resin to a metal substrate without substantially changing the melt flow properties, chemical resistance and thermal stability of the polyphenylene sulfide comprising adding to the resin an effective amount to achieve such enhancement, of a polyimide oligomer resin having the formula:

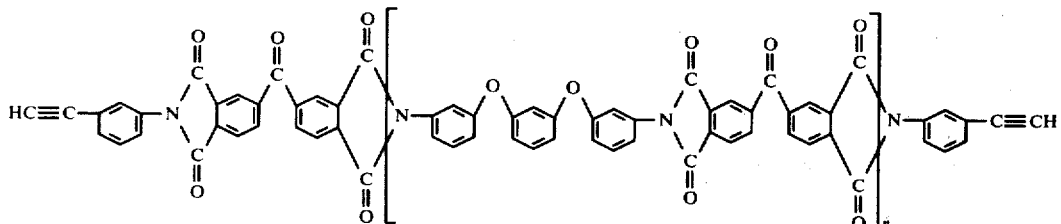

wherein n is from about 1 to about 2.

22. The method of claim 20 or 21, wherein the polyphenylene sulfide resin has the general formula:

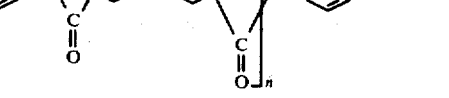

wherein m is a positive integer selected to result in a polyphenylene sulfide polymer which is thermally stable above about 200° C.

23. The method of claim 20 or 21, wherein the amount of polyimide oligomer resin is less than about 15% by weight of the total resin composition.

24. A process for coating a metal substrate comprising:
(a) applying to the substrate a coating of a polyimide produced by the crosslinking and curing of an acetylene terminated aromatic polyimide oligomer to produce a polyimide primed substrate; and
(b) applying to the primed substrate a coating of polyphenylene sulfide.

25. The process of claim 24, wherein the polyphenylene sulfide has the general formula:

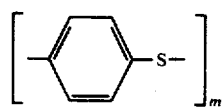

wherein m is a positive integer selected to result in a polyphenylene sulfide polymer which is thermally stable above about 200° C.

26. The process of claim 24, wherein the polyimide oligomer resin is of the formula:

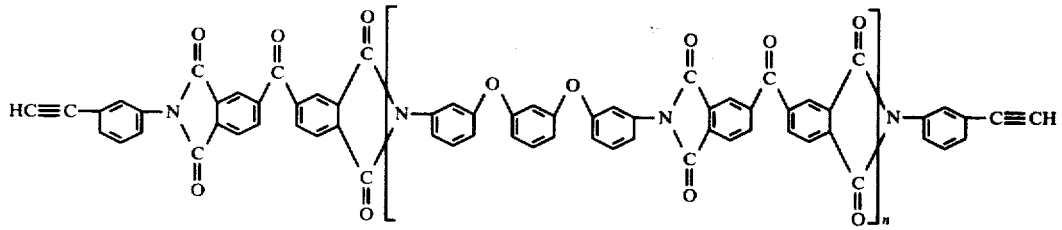

wherein n is from about 1 to about 2.

27. The process of claim 24, 25 or 26, wherein the metal substrate is a pipe coupling.

28. The process of claim 24, 25 or 26, wherein the substrate is a pipe coupling for oil and gas well production pipe.

* * * * *